United States Patent
Freely et al.

(10) Patent No.: US 11,791,693 B2
(45) Date of Patent: Oct. 17, 2023

(54) ELECTRIC MACHINE HAVING AN ELECTRICALLY INSULATIVE MANIFOLD

(71) Applicant: GE Aviation Systems LLC, Grand Rapids, MI (US)

(72) Inventors: Brendan Michael Freely, Cincinnati, OH (US); Mohamed Osama, Garching (DE); Fabian Isaza, Cincinnati, OH (US); Pablo Gabriel Piazza Galarza, Cincinnati, OH (US); Paul Robert Gemin, Cincinnati, OH (US); John Russell Yagielski, Scotia, NY (US); Mark Dame, Niskayuna, NY (US); Wei Zhang, Ballston Lake, NY (US); Karim Younsi, Ballston Park, NY (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 301 days.

(21) Appl. No.: 17/008,017

(22) Filed: Aug. 31, 2020

(65) Prior Publication Data
US 2022/0069670 A1    Mar. 3, 2022

(51) Int. Cl.
| F02C 7/22 | (2006.01) |
| H02K 9/19 | (2006.01) |
| F28F 21/06 | (2006.01) |

(52) U.S. Cl.
CPC .............. *H02K 9/19* (2013.01); *F02C 7/222* (2013.01); *F28F 21/062* (2013.01)

(58) Field of Classification Search
CPC ...... H02K 9/19; H02K 2203/06; H02K 5/225; H02K 3/22–24; F02C 7/222; F28F 21/062
See application file for complete search history.

(56) References Cited

U.S. PATENT DOCUMENTS

| 4,776,313 A | 10/1988 | Freismuth et al. |
| 5,489,810 A | 2/1996 | Ferreira et al. |

(Continued)

FOREIGN PATENT DOCUMENTS

| GB | 1064946 A | 4/1967 |
| GB | 1179553 A | 1/1970 |

(Continued)

OTHER PUBLICATIONS

Dynamic Eflow, Capcooltech®, Simply Cool, Heat Dissipation Through Direct Cooling, The European Union's Horizon 2020 Research & Innovation Program under the Grant Agreement No. 804219, 3 pages. https://www.dynamiceflow.com/capcooltech.

(Continued)

*Primary Examiner* — Bryan R Perez
(74) *Attorney, Agent, or Firm* — Dority & Manning, P.A.

(57) ABSTRACT

An electric machine having an electrically insulative manifold is disclosed. In one example aspect, an electric machine includes a non-electrically conductive manifold. The manifold defines a chamber operable to receive a cooling fluid. The electric machine includes a prime winding in fluid communication with the chamber and one or more secondary windings in electrical communication with the prime winding and in fluid communication with the chamber. Further, the electric machine includes an electric machine terminal extending through the non-electrically conductive manifold and coupled with the prime winding. The electric machine terminal can provide or collect cooling fluid from the chamber of the manifold and can act as the electrical connection point for directing electrical power to or from the windings of the electric machine. The non-electrically conductive manifold electrically decouples the windings of the electric machine despite each winding receiving cooling fluid provided or collected at the manifold.

20 Claims, 9 Drawing Sheets

(56) References Cited

U.S. PATENT DOCUMENTS

| | | |
|---|---|---|
| 7,861,827 B2 | 1/2011 | Madge et al. |
| 9,441,541 B2 | 9/2016 | Wotzak |
| 9,719,737 B2 | 8/2017 | Kalbacher et al. |
| 9,970,527 B2 | 5/2018 | Smith et al. |
| 10,454,329 B2 | 10/2019 | Schweinert |
| 2015/0075759 A1 | 3/2015 | McCandlish et al. |
| 2015/0288011 A1* | 10/2015 | Darling ............. H01M 8/04201 429/458 |
| 2016/0208708 A1 | 7/2016 | Butcher et al. |
| 2016/0226327 A1* | 8/2016 | Rippel .................... H02K 1/20 |
| 2017/0214284 A1* | 7/2017 | Fries ........................ H02K 3/22 |
| 2022/0021260 A1 | 1/2022 | Naderer et al. |

FOREIGN PATENT DOCUMENTS

| | | |
|---|---|---|
| JP | S4853201 A | 7/1973 |
| WO | WO2015/150556 A1 | 10/2015 |
| WO | WO2017/076796 A1 | 5/2017 |
| WO | WO2019/038139 A1 | 2/2019 |

OTHER PUBLICATIONS

Chinese Office Action Corresponding with Application No. 202111011417 dated Aug. 11, 2023.

* cited by examiner

ELECTRIC MACHINE HAVING AN ELECTRICALLY INSULATIVE MANIFOLD

FIELD

The present subject matter relates generally to electric machines, and more particularly to electric machines having cooling systems.

BACKGROUND

Many electric machines, such as high density electric motors, include active cooling circuits to manage thermal constraints. Cooling circuits are frequently either in near proximity to or integrated with current carrying elements in the electric machine due to the nature of heat generation in these machines. Some electric machines include an inlet manifold to distribute cooling fluid to the cooling circuits and an outlet manifold to collect the cooling fluid that has passed through the cooling circuits. Conventionally, such manifolds have been made of electrically-conductive materials, such as aluminum. Electrically-conductive manifolds present certain challenges for electric machines. For instance, cooling fluid received at one of the conductive manifolds can cause a manifold to act as a common electrical point, which can lead to electrical shorting between the current carrying elements of the electric machine. Accordingly, electrical isolators are typically required to electrically isolate the cooling circuits. Electrical isolators can add weight and complexity to the electric machine and can require current carrying elements to have increased length, which can lead to electrical losses.

Therefore, an electric machine that addresses one or more of the challenges above would be useful.

BRIEF DESCRIPTION

Aspects and advantages of the invention will be set forth in part in the following description, or may be obvious from the description, or may be learned through practice of the invention.

In one aspect, an electric machine is provided. The electric machine includes a non-electrically conductive manifold defining a chamber. The electric machine also includes a prime winding in fluid communication with the chamber of the non-electrically conductive manifold and one or more secondary windings in electrical communication with the prime winding and in fluid communication with the chamber of the non-electrically conductive manifold. Further, the electric machine includes an electric machine terminal extending through the non-electrically conductive manifold and coupled with the prime winding.

In another aspect, an electric machine is provided. The electric machine includes a non-electrically conductive manifold defining a chamber, a terminal port, and a plurality of winding ports. Further, the electric machine includes a prime winding and one or more secondary windings connected to respective ones of the plurality of winding ports, the one or more secondary windings being in electrical communication with the prime winding and in fluid communication with the chamber. Moreover, the electric machine includes an electric machine terminal extending through the terminal port, the chamber, and one of the plurality of winding ports, the electric machine terminal being connected to and in electrical communication with the prime winding and being operable to receive cooling fluid.

In yet another aspect, an electric machine is provided. The electric machine includes a non-electrically conductive manifold defining a chamber, a fluid terminal port through which cooling fluid enters the chamber, an electrical terminal port, and a plurality of winding ports. Further, the electric machine includes a prime winding and one or more secondary windings connected to respective ones of the plurality of winding ports, the one or more secondary windings being in electrical communication with the prime winding and in fluid communication with the chamber. In addition, the electric machine includes an electric machine terminal extending through the electrical terminal port, the chamber, and one of the plurality of winding ports, the electric machine terminal being connected to and in electrical communication with the prime winding.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
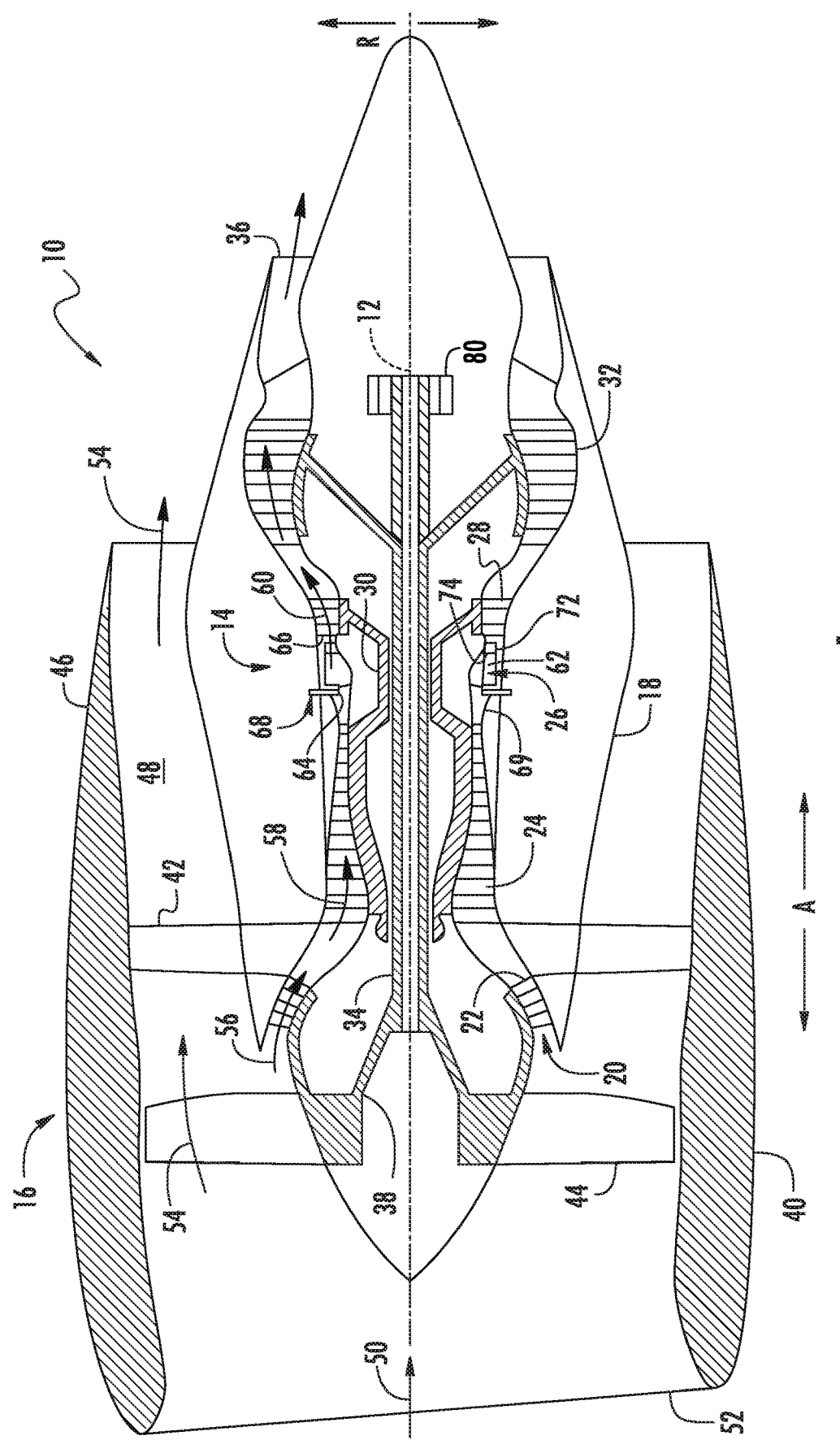
FIG. 1 provides a schematic cross-sectional view of a gas turbine engine according to various embodiments of the present disclosure.

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of any claims and their equivalents.

The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Aspects of the present disclosure are directed to an electric machine having a cooling system. In one example aspect, an electric machine includes a non-electrically conductive manifold. The manifold defines a chamber operable to receive a cooling fluid. The electric machine includes a prime winding and one or more secondary windings in electrical communication with the prime winding. The secondary windings are in fluid communication with the chamber. In this way, if the manifold is an inlet manifold, the manifold can distribute cooling fluid to the secondary windings to provide cooling thereto during operation of the electric machine. If the manifold is an outlet manifold, the manifold can collect cooling fluid exiting the secondary windings. Further, the electric machine includes an electric machine terminal extending through the non-electrically conductive manifold. The electric machine terminal is formed of an electrically conductive material. The electric machine terminal is in electrical communication with the prime winding. The electric machine terminal can also be in fluid communication with the prime winding. The prime winding can be in fluid communication with the chamber as well. The electric machine terminal can provide cooling fluid to or collect cooling fluid from the chamber of the manifold and can act as the electrical connection point for directing electrical power to or from the windings of the electric machine. The electric machine terminal can also provide cooling fluid to or collect cooling fluid from the prime winding. The non-electrically conductive manifold electrically decouples or isolates the windings of the electric machine despite each winding receiving cooling fluid provided or collected at the manifold. The electric machine can be implemented in any suitable application, such as aviation applications.

FIG. 1 provides a schematic cross-sectional view of an exemplary turbomachine as may incorporate various embodiments of the present disclosure. Particularly, FIG. 1 provides an aviation high-bypass turbofan engine herein referred to as "turbofan 10". The turbofan 10 of FIG. 1 can be mounted to an aerial vehicle, such as a fixed-wing aircraft, and can produce thrust for propulsion of the aerial vehicle. For reference, the turbofan 10 defines an axial direction A, a radial direction R, and a circumferential direction. Moreover, the turbofan 10 defines an axial centerline or longitudinal axis 12 that extends along the axial direction A for reference purposes. In general, the axial direction A extends parallel to the longitudinal axis 12, the radial direction R extends outward from and inward to the longitudinal axis 12 in a direction orthogonal to the axial direction A, and the circumferential direction extends three hundred sixty degrees (360°) around the longitudinal axis 12.

The turbofan 10 includes a core gas turbine engine 14 and a fan section 16 positioned upstream thereof. The core engine 14 includes a tubular outer casing 18 that defines an annular core inlet 20. The outer casing 18 further encloses and supports a booster or low pressure compressor 22 for pressurizing the air that enters core engine 14 through core inlet 20. A high pressure, multi-stage, axial-flow compressor 24 receives pressurized air from the LP compressor 22 and further increases the pressure of the air. The pressurized air stream flows downstream to a combustor 26 where fuel is injected into the pressurized air stream and ignited to raise the temperature and energy level of the pressurized air. The high energy combustion products flow from the combustor 26 downstream to a high pressure turbine 28 for driving the high pressure compressor 24 through a high pressure spool 30 or a second rotatable component. The high energy combustion products then flow to a low pressure turbine 32 for driving the LP compressor 22 and the fan section 16 through a low pressure spool 34 or a first rotatable component. The LP spool 34 is coaxial with the HP spool 30 in this example embodiment. After driving each of the turbines 28 and 32, the combustion products exit the core engine 14 through an exhaust nozzle 36 to produce propulsive thrust.

The fan section 16 includes a rotatable, axial-flow fan rotor 38 that is surrounded by an annular fan casing 40. The fan casing 40 is supported by the core engine 14 by a plurality of substantially radially-extending, circumferentially-spaced outlet guide vanes 42. In this way, the fan casing 40 encloses the fan rotor 38 and a plurality of fan blades 44. A downstream section 46 of the fan casing 40 extends over an outer portion of the core engine 14 to define a bypass passage 48. Air that passes through the bypass passage 48 provides propulsive thrust as will be explained further below. In some alternative embodiments, the LP spool 34 may be connected to the fan rotor 38 via a speed reduction device, such as a reduction gear gearbox in an indirect-drive or geared-drive configuration. Such speed reduction devices can be included between any suitable shafts/spools within the turbofan 10 as desired or required.

During operation of the turbofan 10, an initial or incoming airflow, represented by arrow 50, enters the turbofan 10 through an inlet 52 defined by the fan casing 40. The airflow 50 passes through the fan blades 44 and splits into a first air flow (represented by arrow 54) that moves through the bypass passage 48 and a second air flow (represented by arrow 56) which enters the LP compressor 22 through the core inlet 20.

The pressure of the second airflow 56 is progressively increased by the LP compressor 22 and then enters the HP compressor 24, as represented by arrow 58. The discharged pressurized air stream flows downstream to the combustor 26 where fuel is introduced to generate combustion gases or products. The combustion products 60 exit the combustor 26 and flow through the HP turbine 28. The combustion products 60 then flow through the LP turbine 32 and exit the exhaust nozzle 36 to produce thrust. Moreover, as noted above, a portion of the incoming airflow 50 flows through the bypass passage 48 and through an exit nozzle defined between the fan casing 40 and the outer casing 18 at the downstream section 46 of the fan casing 40. In this way, substantial propulsive thrust is produced.

As further shown in FIG. 1, the combustor 26 defines an annular combustion chamber 62 that is generally coaxial with the longitudinal centerline axis 12, as well as an inlet 64 and an outlet 66. The combustor 26 receives an annular stream of pressurized air from a high pressure compressor discharge outlet 69. A portion of this compressor discharge air ("CDP" air) flows into a mixer (not shown). Fuel is injected from a fuel nozzle 68 to mix with the air and form a fuel-air mixture that is provided to the combustion chamber 62 for combustion. Ignition of the fuel-air mixture is accomplished by a suitable igniter, and the resulting combustion gases 60 flow in an axial direction A toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the HP turbine 28. For this embodiment, the HP turbine 28 rotates the HP compressor 24 via the HP spool 30 and the LP turbine 32 drives the LP compressor 22 and the fan rotor 38 via the LP spool 34.

Notably, for this embodiment, the turbofan 10 is an aeronautical electric hybrid propulsion machine. Particularly, turbofan 10 includes one or more electric machines operably coupled with rotary components thereof. For the depicted embodiment of FIG. 1, the turbofan 10 includes an electric machine 80 operatively coupled with the LP spool 34. Although the electric machine 80 is operatively coupled with the LP spool 34 at an aft end of the LP spool 34, the electric machine 80 can be mounted to the LP spool 34 at any suitable location. In some embodiments, the electric machine 80 can be an electric motor operable to drive or motor the LP spool 34, e.g., during an engine burst. In other embodiments, the electric machine 80 can be an electric generator operable to convert mechanical energy into electrical energy. In this way, electrical power generated by the electric machine 80 can be directed to various engine and/or aircraft systems. In some embodiments, the electric machine 80 can function as a motor/generator with dual functionality. In some embodiments, one or more electric machines can be operatively coupled with the HP spool 30 and can be motors, generators, and/or combination motor/generators. In other embodiments, one or more electric machines can be operatively coupled with other rotary components of the turbofan 10 and can be motors, generators, and/or combination motor/generators.

Although turbofan 10 has been described and illustrated in FIG. 1 as representing an example hybrid turbomachine, the subject matter of the present disclosure may apply to or be incorporated with other suitable types of multi-spool turbomachines. For instance, the subject matter of the present disclosure may apply to or be incorporated with other suitable turbine engines, such as steam and other gas turbine engines. Example gas turbine engines may include, without limitation, turbojets, turboprop, turboshaft, aeroderivatives, auxiliary power units, etc. Further, the electric machines and features thereof described in the present disclosure may be applied to or incorporated in other suitable applications outside of aviation applications. Indeed, the electric machines and inventive features described herein can be applied to or incorporated into any suitable application or industry in which an electric machine with cooling features is applicable.

Figure 2:
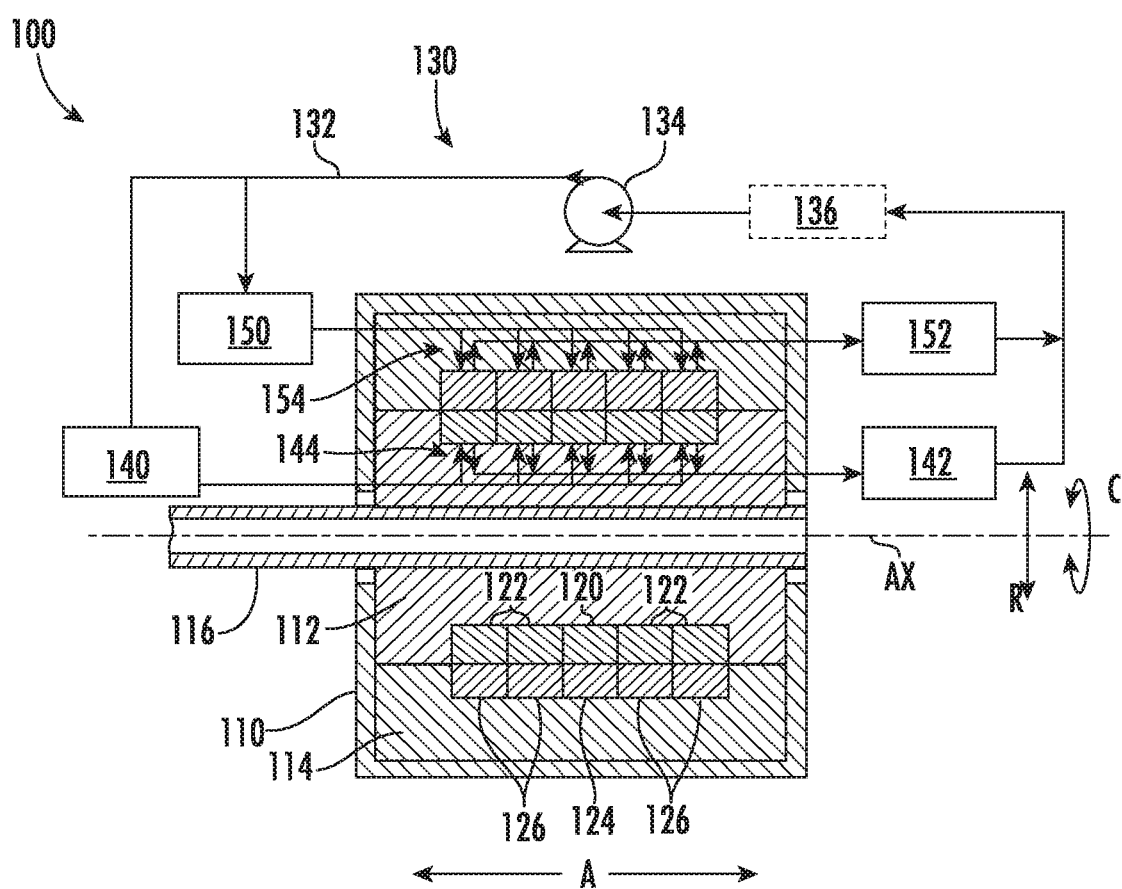
FIG. 2 provides a schematic view of an electric machine according to an example embodiment of the present disclosure.

FIG. 2 provides a schematic view of an electric machine 100 according to an example embodiment of the present disclosure. For reference, the electric machine 100 defines an axial direction A, a radial direction R, and a circumferential direction C. As depicted, the electric machine 100 includes a casing 110 or housing. The electric machine 100 also includes a rotor 112 and a stator 114 encased within the casing 110. The rotor 112 is operatively coupled with a shaft 116. The shaft 116 can be supported by the casing 110 via one or more bearings (not shown). The shaft 116 can be any suitable shaft, e.g., a drive shaft, a low pressure or a high pressure shaft of an aviation gas turbine engine (FIG. 1), etc. The shaft 116 is rotatable about an axis of rotation AX. The rotor 112 is rotatable in unison with the shaft 116 about the axis of rotation AX. The stator 114 is fixed relative to the rotor 112 and the shaft 116.

The rotor 112 and the stator 114 each include a plurality of current carrying elements, e.g., windings or coils. Particularly, the rotor 112 includes a prime winding 120 and one or more one or more secondary windings 122 in electrical communication with the prime winding 120. The one or more secondary windings 122 can be electrically connected to the prime winding 120 in series. Notably, the rotor 112 of the electric machine 100 includes at least one prime winding and one or more associated secondary windings in electrical communication with the at least one prime winding. In the depicted embodiment of FIG. 2, for instance, the rotor 112 of the electric machine 100 includes a single prime winding and four associated secondary windings. In some embodiments, the rotor 112 can include a plurality of prime windings each having associated one or more secondary windings in electrical communication therewith.

For instance, in one example embodiment, the electric machine 100 can be a three-phase electric machine. In such an embodiment, the electric machine 100 can include a first prime winding and one or more secondary windings in electrical communication with the first prime winding, a second prime winding and one or more secondary windings in electrical communication with the second prime winding, and a third prime winding and one or more secondary windings in electrical communication with the third prime winding. In another example embodiment, the electric machine 100 can be a six-phase electric machine. In such an embodiment, the electric machine 100 can include a first, second, third, fourth, fifth, and six prime winding. Each of the six prime windings can include one or more secondary windings in electrical communication with their respective prime windings. The prime windings can be electrically connected to their associated one or more secondary windings in series. The sets of windings (with a set of windings being denoted as a prime winding and its associated one or more secondary windings) can be electrically connected to one another in parallel, for example.

Like the rotor 112, the stator 114 includes a prime winding 124 and one or more one or more secondary windings 126 in electrical communication with the prime winding 124. The one or more secondary windings 126 can be electrically connected to the prime winding 124 in series. Notably, the stator 114 of the electric machine 100 includes at least one prime winding and one or more associated secondary windings in electrical communication with the at least one prime winding. In the depicted embodiment of FIG. 2, for instance, the stator 114 of the electric machine 100 includes a single prime winding and four associated secondary windings.

In some embodiments, the rotor 112 can include a plurality of prime windings each having associated one or more secondary windings in electrical communication therewith. For instance, as one example, in embodiments in which the electric machine 100 is a three-phase electric machine, the stator 114 can have three prime windings each having associated one or more secondary windings. As another example, in embodiments in which the electric machine 100 is a six-phase electric machine, the stator 114 can have six prime windings each having associated one or more secondary windings. The prime windings of the stator 114 can be electrically connected to their associated one or more secondary windings in series. The sets of windings (with a set of windings being denoted as a prime winding and its associated one or more secondary windings) can be electrically connected to one another in parallel, for example.

As will be appreciated, when the electric machine 100 functions as a generator, the movement of the coils or windings 120, 122 of the rotor 112 relative to the coils or windings 124, 126 of the stator 114 causes electrical power to be generated. When the electric machine 100 functions as a motor, the movement of the coils or windings 120, 122 of the rotor 112 relative to the coils or windings 124, 126 of the stator 114 causes an applied torque or force on the shaft 116 thereby causing the shaft 116 to rotate about the axis of rotation AX.

As further shown in FIG. 2, the electric machine 100 includes a cooling system 130. Generally, the cooling system 130 is operable to cool the windings of the electric machine 100. The cooling system 130 of the electric machine 100 includes a cooling loop 132 along which a coolant or cooling fluid flows. The cooling fluid can be any suitable dielectric fluid or fluid with high electrical resistivity. As one example, the cooling fluid can be oil. Moreover, for this embodiment, the cooling loop 132 is a closed loop, and thus, the cooling system 130 of the electric machine 100 is a sealed system. A pump 134 is positioned along the cooling loop 132 to move cooling fluid along the cooling loop 132.

A stator inlet manifold 150 is positioned along the cooling loop 132. The stator inlet manifold 150 is a non-electrically conductive manifold. Stated another way, the stator inlet manifold 150 is a non-electrically conducting manifold. Cooling fluid flowing downstream of the pump 134 is received by the stator inlet manifold 150 and the stator inlet manifold 150 distributes the cooling fluid to a plurality of cooling circuits 154 that cool the windings 124, 126 of the stator 114. For this embodiment, the cooling circuits 154 are integrated with the windings 124, 126. Particularly, the windings 124, 126 are hollow and cooling fluid is directed through the hollow windings to provide cooling thereto. The cooling fluid exits the cooling circuits 154 and is collected by a stator outlet manifold 152 positioned along the cooling loop 132. Similar to the stator inlet manifold 150, the stator outlet manifold 152 is a non-electrically conductive manifold. That is, the stator outlet manifold 152 is a non-electrically conducting manifold.

For this embodiment, a rotor inlet manifold 140 is positioned along the cooling loop 132. The rotor inlet manifold 140 is a non-electrically conductive manifold. Stated another way, the rotor inlet manifold 140 is a non-electrically conducting manifold. Cooling fluid flowing downstream of the pump 134 is received by the rotor inlet manifold 140 and the rotor inlet manifold 140 distributes the cooling fluid to a plurality of cooling circuits 144 that cool the windings 120, 122 of the rotor 112. For this embodiment, the cooling circuits 144 are integrated with the windings 120, 122. Particularly, the windings 120, 122 are hollow and cooling fluid is directed through the hollow windings to provide cooling thereto. The cooling fluid exits the cooling circuits 144 and is collected by a rotor outlet manifold 142 positioned along the cooling loop 132. Similar to the rotor inlet manifold 140, the rotor outlet manifold 142 is a non-electrically conductive manifold. That is, the rotor outlet manifold 142 is a non-electrically conducting manifold.

Optionally, the cooling fluid exiting the stator outlet manifold 152 and the rotor outlet manifold 142 can pass through a heat exchanger 136 positioned along the cooling loop 132. In this way, the cooling fluid can be cooled prior to being recirculated along the cooling loop 132 by pump 134. The heat exchanger 136 can be any suitable type of heat exchanger 136, such as an air-cooled heat exchanger or a liquid-cooled heat exchanger.

Although the electric machine 100 has been described and illustrated in FIG. 2 as having a particular configuration, it will be appreciated that the inventive aspects of the present disclosure may apply to electric machines having alternative configurations or cooling systems. For instance, in some alternative embodiments, the stator inlet manifold 150 and the rotor inlet manifold 140 can be combined or integrated into a single inlet manifold. Similarly, additionally or alternatively, the stator outlet manifold 152 and the rotor outlet manifold 142 can be combined or integrated into a single outlet manifold. Further, the stator 114 and/or rotor 112 may have different configurations or may be arranged in a different manner than illustrated in FIG. 2.

Figure 3:
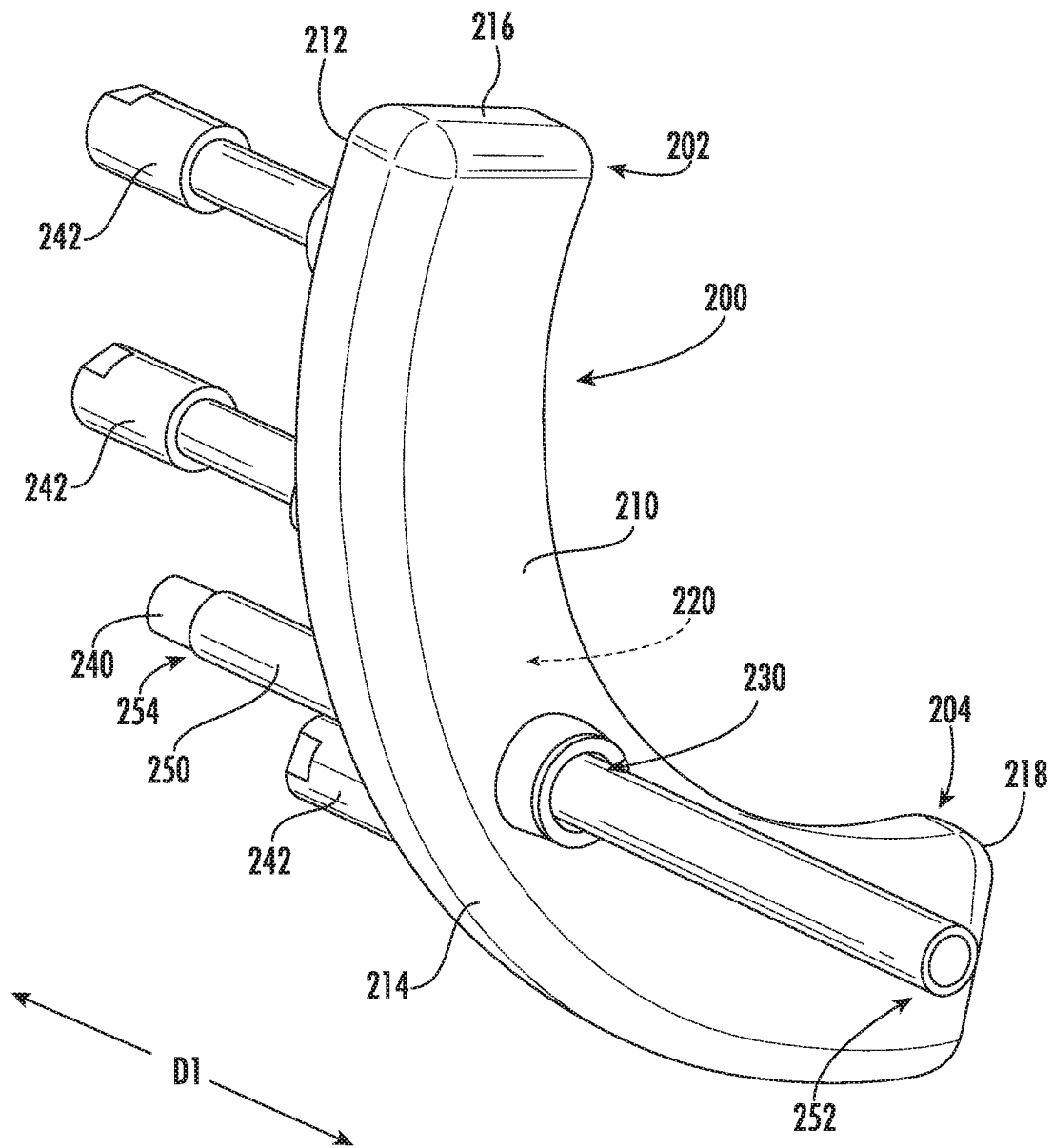
FIG. 3 provides a perspective view of a manifold of an electric machine according to one example embodiment of the present disclosure.
Figure 4:
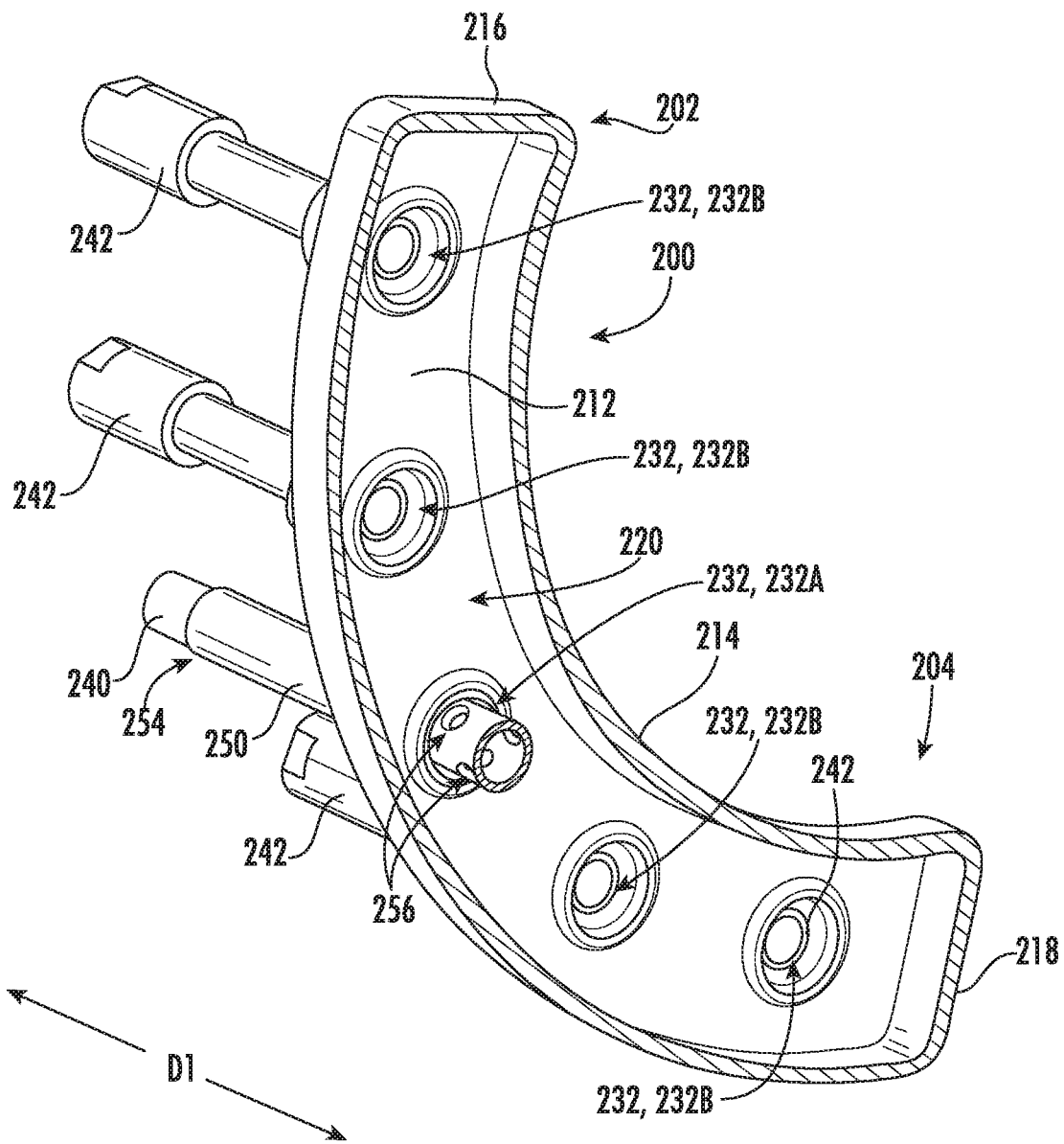
FIG. 4 provides a perspective cross-sectional view of the manifold of FIG. 3.
Figure 5:
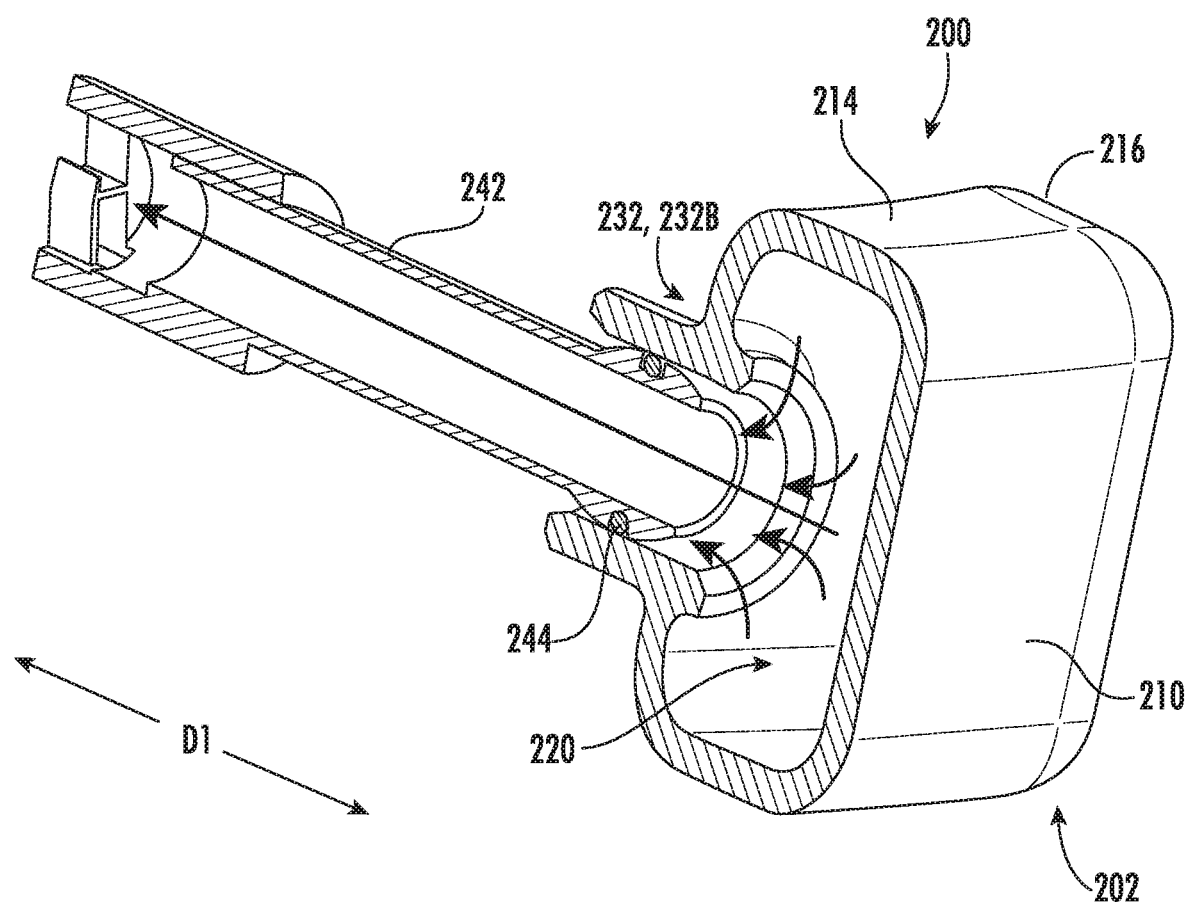
FIG. 5 provides a perspective cross-sectional view of the manifold of FIG. 3 and depicts a secondary winding of the electric machine in section.
Figure 6:
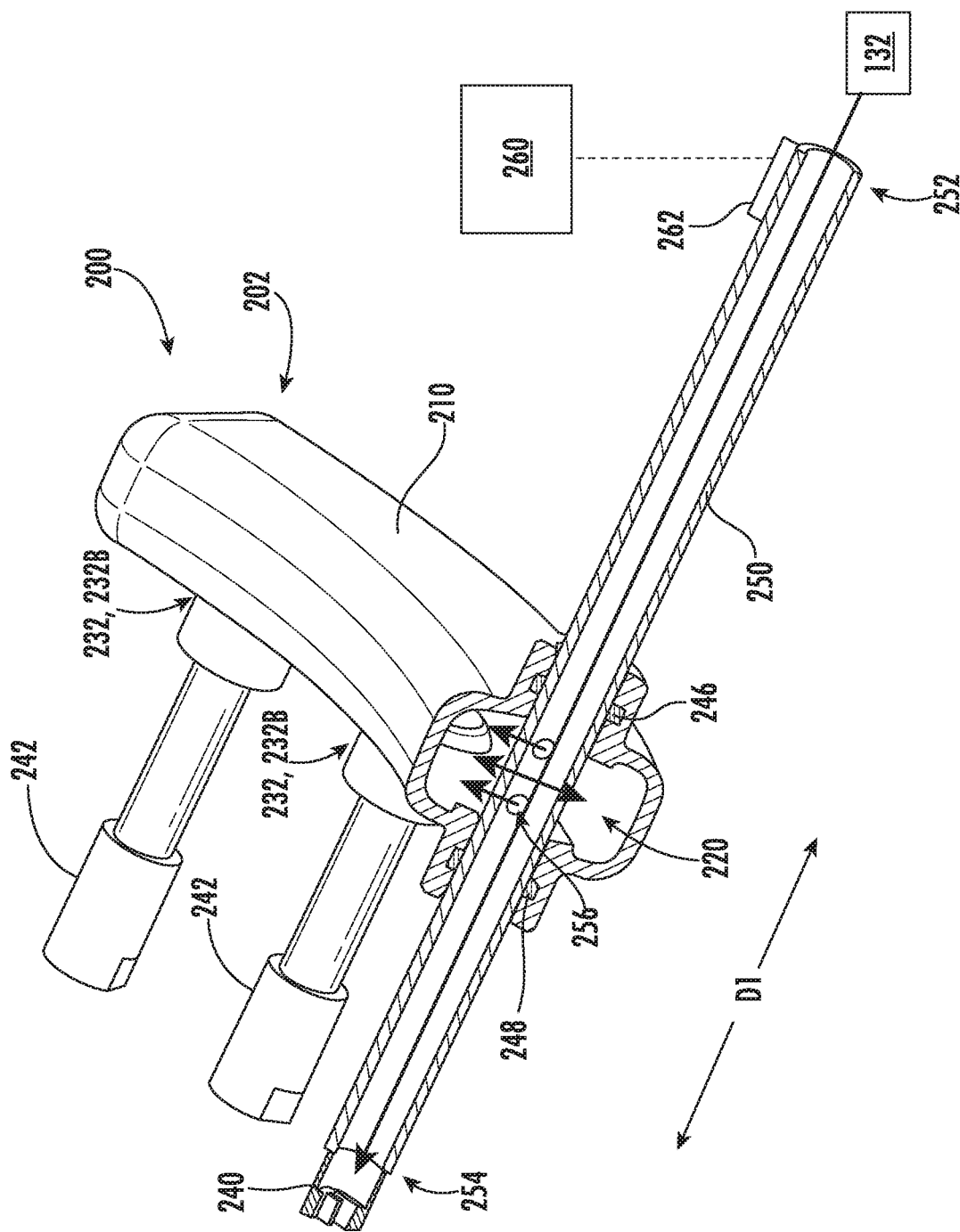
FIG. 6 provides a perspective cross-sectional view of the manifold of FIG. 3 and depicts an electric machine terminal of the electric machine in section.

FIGS. 3 through 6 provide various views of a non-electrically conductive manifold 200 for an electric machine according to one example embodiment of the present disclosure. Particularly, FIG. 3 provides a perspective view of the non-electrically conductive manifold. FIG. 4 provides a perspective cross-sectional view of the non-electrically conductive manifold 200. FIG. 5 provides a perspective cross-sectional view of the non-electrically conductive manifold 200 and depicts a secondary winding in section. FIG. 6 provides another perspective cross-sectional view of the non-electrically conductive manifold 200. Any of the manifolds 140, 142, 150, 152 of FIG. 2 can be configured in the same or similar manner as the non-electrically conductive manifold 200 of FIGS. 3 through 6. The non-electrically conductive manifold 200 can be formed of any suitable non-electrically conductive material. As one example, the non-electrically conductive manifold 200 can be formed of a non-electrically conductive composite material. As another example, the non-electrically conductive manifold 200 can be formed of a ceramic material. As yet another example, the non-electrically conductive manifold 200 can be formed of a ceramic composite material. In some embodiments, the non-electrically conductive manifold 200 is formed of at least one of Torlon, a G11 material, a G10 material, and Acculam.

As shown best in FIG. 3, for reference, the manifold 200 defines a first direction D1. The manifold 200 extends between a first end 202 and a second end 204. For this embodiment, the manifold 200 has an arcuate or banana-like shape. In other embodiments, the manifold 200 may have any other suitable shape, such as a rectangular cuboid shape. As depicted, the manifold 200 has a first wall 210 and a second wall 212 spaced from the first wall 210, e.g., along the first direction D1. A sidewall 214 extends between and connects the first wall 210 and the second wall 212. A first endwall 216 connects the first wall 210, the second wall 212, and the sidewall 214 at the first end 202 of the manifold 200. A second endwall 218 connects the first wall 210, the second wall 212, and the sidewall 214 at the second end 204 of the manifold 200. The manifold 200 defines a chamber 220, and more particularly, the walls 210, 212, 214, 216, 218 of the manifold 200 collectively define the chamber 220.

Further, as shown best in FIGS. 3 and 4, the manifold 200 defines a terminal port 230 and one or more winding ports 232. More particularly, for this embodiment, the terminal port 230 is defined by the first wall 210 and the plurality of winding ports 232 are defined by the second wall 212. The terminal port 230 is defined by the first wall 210 midway or substantially midway between the first end 202 and the second end 204 of the manifold 200. Thus, for the depicted embodiment, the terminal port 230 is centrally positioned with respect to the first and second ends 202, 204 of the manifold 200. The second wall 212 defines five winding ports 232 as depicted in FIG. 4. A prime winding port 232A of the winding ports 232 is aligned with the terminal port 230. Thus, the prime winding port 232A is defined by the second wall 212 midway or substantially midway between the first end 202 and the second end 204 of the manifold 200. Two secondary winding ports 232B of the winding ports 232 are positioned on each side of the prime winding port 232A as shown in FIG. 4.

A prime winding 240 and one or more secondary windings 242 are coupled with the manifold 200. The prime winding 240 and the secondary windings 242 are current carrying members that are hollow for receiving cooling fluid. Thus, for this embodiment, the windings 240, 242 define the cooling circuits. The cooling fluid received within the windings 240, 242 provides cooling to windings during operation of the electric machine to which the manifold 200 and windings 240, 242 are incorporated. The secondary windings 242 can be in electrical communication with the prime winding 240, e.g., in series.

The secondary windings 242 are connected to the manifold 200 at respective winding ports 232. Particularly, the secondary windings 242 are connected to the manifold 200 at respective secondary winding ports 232B. The secondary windings 242 are each in fluid communication with the chamber 220 of the manifold 200. In this manner, if the manifold 200 is an inlet manifold, cooling fluid (e.g., oil) can flow from the chamber 220 of the manifold 200 into the secondary windings 242 to provide cooling thereto. If the manifold 200 is an outlet manifold, cooling fluid can flow from the secondary windings 242 into the chamber 220 of the manifold 200. FIG. 5 depicts cooling fluid flowing from the chamber 220 of the manifold 200 into one of the secondary windings 242. Thus, in FIG. 5, the manifold 200 is an inlet manifold. It will be appreciated that if the manifold 200 of FIG. 5 was an outlet manifold that the cooling fluid would flow in the opposite direction, i.e., from the secondary winding 242 into the chamber 220. One or more sealing elements can be positioned at the interface between each secondary winding 242 and their respective secondary winding ports 232B. For instance, as shown in FIG. 5, a sealing element 244 is positioned at the interface between the depicted secondary winding 242 and its associated secondary winding port 232B. Such sealing elements seal the secondary windings 242 with respect to the manifold 200 at their associated secondary winding ports 232B.

As depicted in FIGS. 3, 4, and 6, an electric machine terminal 250 extends through the non-electrically conductive manifold 200 and is coupled with the prime winding 240. More specifically, the electric machine terminal 250 extends through the terminal port 230 defined by the first wall 210, the chamber 220, and one of the plurality of winding ports 232, or more specifically, the prime winding port 232A. For this example embodiment, the electric machine terminal 250 is a hollow tubular member and is formed of an electrically conductive material, such as copper. Generally, for this embodiment, the electric machine terminal 250 functions as the electrical connection point or terminal of the electric machine to which the manifold is incorporated and as the conduit that delivers or carries cooling fluid to or from the manifold 200 depending on whether the manifold is an inlet or outlet manifold.

The electric machine terminal 250 extends between a first end 252 and a second end 254, e.g., along the first direction D1. The first end 252, located on a side of the manifold 200 near the first wall 210, is electrically coupled with an electrical system 260. The electrical system 260 can include one or more power sources, e.g., energy storage devices such as batteries, capacitors, etc., electrical devices such as inverters and converters, as well as other devices. A system terminal 262 can electrically connect the electrical system 260 with the electric machine terminal 250 as shown in FIG. 6. In FIG. 6, the system terminal 262 and the electrical system 260 are depicted schematically. As one example, when the electric machine in which the manifold 200 is incorporated acts as a motor, electrical power can be directed from a power source of the electrical system 260 to the system terminal 262, and as the system terminal 262 and the electric machine terminal 250 are in electrical communication, the electrical power can be directed to the electric machine. In this manner, the electric machine terminal 250 can be in electrical communication with a power source of the electrical system 260 and can be operable to carry electrical power received from the power source to the prime winding 240 electrically coupled with the electric machine terminal 250. As another example, when the electric machine in which the manifold 200 is incorporated acts as a generator, electrical power generated by the electric machine can be directed to the electric machine terminal 250, and as the electric machine terminal 250 and the system terminal 262 are in electrical communication, the generated electrical power can be directed to the electrical system 260, e.g., to one or more energy storage devices thereof.

In addition, the first end 252 of the electric machine terminal 250 is fluidly coupled with a coolant system that can provide or collect cooling fluid. For instance, the first end 252 of the electric machine terminal 250 can be in fluid communication with a cooling loop, such as the cooling loop 132 of FIG. 2. As noted above, for this embodiment, the electric machine terminal 250 is hollow. Thus, the electric machine terminal 250 can receive cooling fluid and cooling fluid may flow through or along the electric machine terminal 250.

On one hand, if the manifold 200 is an inlet manifold, cooling fluid (e.g., oil) can flow from the coolant system, e.g., from the cooling loop 132, into the first end 252 of the electric machine terminal 250. In FIG. 6, cooling fluid is shown entering the first end 252 of the electric machine terminal 250 from the cooling loop 132. The cooling fluid can flow along the electric machine terminal 250 and a portion of the cooling fluid can flow into the chamber 220. As shown best in FIGS. 4 and 6, the electric machine terminal 250 defines one or more openings 256 through which cooling fluid flows from the electric machine terminal 250 into the chamber 220 of the manifold 200, e.g., when the manifold 200 is an inlet manifold. The portion of the electric machine terminal 250 that defines the openings 256 is positioned or received within the chamber 220 of the manifold 200.

For this embodiment, the electric machine terminal 250 defines a plurality of openings 256. The openings 256 are offset from one another around the circumference or perimeter of the electric machine terminal 250 by ninety degrees (90°). However, other opening spacing arrangements and/or configurations are possible. In some embodiments, the electric machine terminal 250 defines at least four openings. In other embodiments, the electric machine terminal 250 defines at least two openings opposed from one another, e.g., by one hundred eighty degrees (180°).

On the other hand, if the manifold 200 is an outlet manifold, cooling fluid can flow from the chamber 220 of the manifold into the openings 256 defined by the electric machine terminal 250 and downstream through the opening of the electric machine terminal 250 at its first end 252. The cooling fluid can flow through the opening at the first end 252 of the electric machine terminal 250 and into the coolant system, e.g., into the cooling loop 132. Accordingly, it will be appreciated that if the manifold 200 of FIG. 6 was an outlet manifold that the cooling fluid would flow in the opposite direction, i.e., toward the first end 252 of the electric machine terminal 250 along the first direction D1.

One or more sealing elements can be positioned at the interface between the terminal port 230 and the electric machine terminal 250 and one or more sealing elements can be positioned at the interface between the prime winding port 232A and the electric machine terminal 250. For instance, as shown in FIG. 6, a sealing element 246 is positioned at the interface between the terminal port 230 and the electric machine terminal 250. Further, a sealing element 248 is positioned at the interface between the prime winding port 232A and the electric machine terminal 250. Such sealing elements seal the electric machine terminal 250 with respect to the manifold 200.

As shown in FIGS. 3, 4, and 6, the electric machine terminal 250 is coupled with the prime winding 240. For this embodiment, the electric machine terminal 250 is coupled with the prime winding 240 mechanically, electrically, and fluidly. Particularly, the second end 254 of the electric machine terminal 250, located on a second side of the manifold 200 near the second wall 212, is mechanically coupled with or connected to the prime winding 240. The electric machine terminal 250 can be mechanically coupled with the prime winding 240 in any suitable manner. For example, the electric machine terminal 250 can be fitted with the prime winding 240. The electric machine terminal 250 can be fitted directly with the prime winding 240 or indirectly, e.g., via an electrically-conductive fitting. FIGS. 3, 4, and 6 depict the electric machine terminal 250 mechanically coupled with the prime winding 240.

The electric machine terminal 250 is electrically coupled or in electrical communication with the electric machine terminal 250. As noted above, the electric machine terminal 250 can be formed of an electrically conductive material (e.g., copper). The prime winding 240, as will be appreciated, can also be formed of an electrically conductive material. Thus, if the electric machine in which the manifold 200 is incorporated is operating as a motor, electrical power can be directed to the electric machine terminal 250 as described above, and as the electric machine terminal 250 and the prime winding 240 are electrically coupled, electric current can be carried to the prime winding 240 by the electric machine terminal 250. As the prime winding 240 is in electrical communication with its associated secondary windings 242, electrical power can be directed to the secondary windings 242 as well. In this manner, the electric machine terminal 250 is operable to carry electrical power received from the electrical system 260, e.g., a power source thereof, to the prime winding 240. If the electric machine in which the manifold 200 is incorporated is operating as a generator, electrical power can be collected by the prime winding 240 and carried by the electric machine terminal 250 to the electrical system 260, e.g., to an energy storage device thereof. In this way, the electric machine terminal 250 is operable to carry electrical power received from the prime winding 240 to the electrical system 260, e.g., an energy storage device thereof.

The electric machine terminal 250 is also fluidly coupled or in fluid communication with the electric machine terminal 250. Accordingly, if the manifold 200 is an inlet manifold, cooling fluid flowing downstream from the first end 252 to the second end 254 of the electric machine terminal 250 along the first direction D1 can flow into the prime winding 240, e.g., as shown best in FIG. 6. The hollow prime winding 240 can receive the cooling fluid and the fluid can flow along the prime winding 240 to provide cooling thereto. Thus, in this example embodiment, the cooling circuit is defined by or integrated into the prime winding 240.

If the manifold 200 is an outlet manifold, cooling fluid exits the prime winding 240 and flows into the opening at the second end 254 of the electric machine terminal 250. The cooling fluid continues flowing downstream from the second end 254 to the first end 252 of the electric machine terminal 250 along the first direction D1. The cooling fluid can exit the electric machine terminal 250 at the opening at the first end 252 of the electric machine terminal 250. The cooling fluid can exit the electric machine terminal 250 and can flow downstream, e.g., along the cooling loop 132.

Notably, the electric machine terminal 250 also provides cooling fluid to (when the manifold 200 is an inlet manifold) or collects cooling fluid from (when the manifold 200 is an outlet manifold) the secondary windings 242. Particularly, if the manifold 200 is an inlet manifold, a portion of the cooling fluid flowing downstream from the first end 252 toward the second end 254 along the electric machine terminal 250 flows through the openings 256 defined by the electric machine terminal 250. As noted above, a portion of the cooling fluid flowing downstream from the first end 252 toward the second end 254 along the electric machine terminal 250 flows past the openings 256 and into the prime winding 240, e.g., for providing cooling thereto. The cooling fluid that flows through the openings 256 enters the chamber 220 of the manifold 200, e.g., as shown best in FIG. 6, and is distributed to the secondary windings 242. The cooling fluid can flow into the secondary windings 242, e.g., as shown in FIG. 5, to provide cooling thereto.

If the manifold 200 is an outlet manifold, the cooling fluid exits the secondary windings 242 and enters the chamber 220 of the manifold. The cooling fluid flows into the electric machine terminal 250 through the openings 256. The cooling fluid that enters the electric machine terminal 250 through the openings 256 mixes with the cooling fluid flowing downstream from the prime winding 240. The mixed cooling fluid flows downstream toward the first end 252 of the electric machine terminal 250 along the first direction D1 and exits the electric machine terminal 250 through an opening at the first end 252. The cooling fluid can flow to a coolant system. For instance, as noted above, the cooling fluid can exit the electric machine terminal 250 and can flow downstream along the cooling loop 132.

Accordingly, to summarize with reference to FIG. 2, cooling fluid is moved along the cooling loop 132 by the pump 134 during operation of the electric machine 100. The cooling fluid can enter the inlet manifolds 140, 150. The inlet manifolds 140, 150 can be configured as shown in FIGS. 3 through 6. The inlet manifolds can be non-electrically conductive or insulative manifolds. Cooling fluid enters the manifolds through their respective electric machine terminals. A portion of the cooling fluid flows downstream into the chambers of the manifolds 140, 150 through openings defined by their respective electric machine terminals and ultimately into their respective secondary windings, e.g., to provide cooling thereto. The hollow secondary windings function as current-carrying members as well as cooling circuits of the electric machine. A portion of the cooling fluid flowing along the respective electric machine terminals flows past their openings and into their respective prime windings, e.g., to provide cooling thereto. The hollow prime windings function as current-carrying members as well as cooling circuits of the electric machine. The prime windings can also function as the excitation members of the electric machine as will be appreciated. The cooling fluid flows through the respective prime and secondary windings and eventually flows into the respective outlet manifolds 142, 152. The outlet manifolds 142, 152 can be non-electrically conductive or insulative manifolds. The cooling fluid can exit the outlet manifolds as described herein and can flow downstream to pump 134 where the cooling fluid is recirculated. Optionally, the cooling fluid can flow through one or more heat exchangers 136 positioned along the cooling loop 132. Notably, as both the inlet and outlet manifolds 140, 150, 142, 152 are non-electrically conductive or insulative manifolds, the current-carrying members are electrically decoupled or isolated from one another despite receiving cooling fluid being distributed/collected at the common point manifolds.

The manifold 200 and its features described and illustrated herein in FIGS. 3 through 6 and as may be applied to any or all of the manifolds of the electric machine 100 of FIG. 2 provide a number of advantages and benefits. For instance, the manifold 200 disclosed herein allows for decoupling of the electrical circuits and cooling fluid of the cooling system despite the fact that the cooling circuits carrying cooling fluid are integrated directly into the current-carrying elements or windings. Moreover, the manifold 200 disclosed herein allows for electrical independence or isolation of all cooling circuits connected to a given manifold. That is, the non-electrically conductive manifold described herein allows for the distribution and collection of cooling fluid (e.g., oil) between current-carrying elements that are integrated directly with the cooling circuits without electrically tying the current-carrying elements together.

Moreover, the manifold 200 disclosed herein may provide an improved form-factor and weight reduction at least in part due to the electrically non-electrically conductive manifold and its associated features, as well as the arrangement of these features. Further, the manifold 200 disclosed herein may provide an improved package safety due to the minimization of the "live" electrically conductive areas of the electric machine and its associated cooling system. In addition, the manifold 200 disclosed herein may reduce the electrical loss and heat generated due to decreased conduction path length of the windings. This is so as the need to provide electrical isolators is eliminated or greatly reduced due to the manifold being formed of a non-electrically conductive material.

Figure 7:
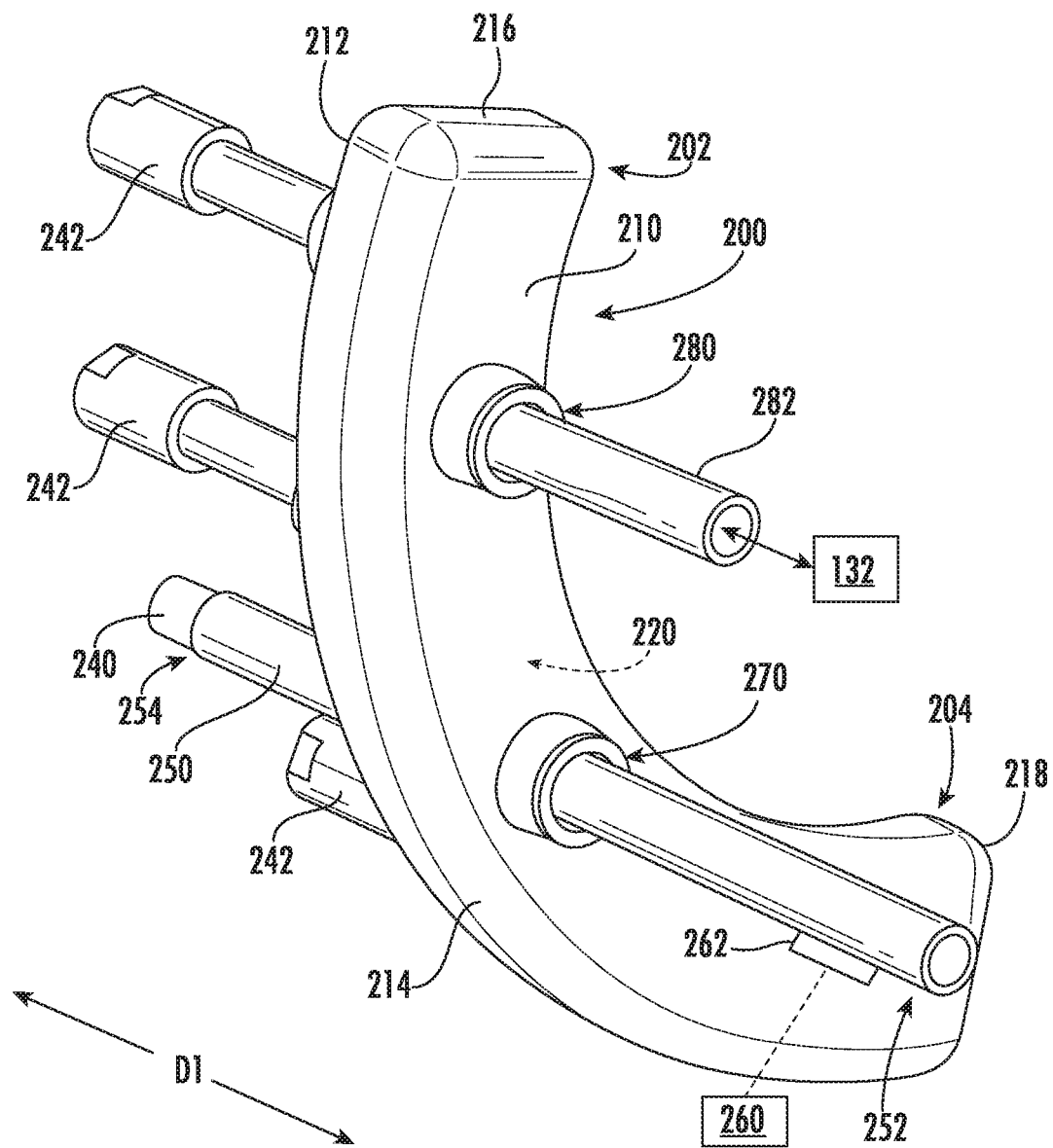
FIG. 7 provides a perspective view of a manifold of an electric machine according to another example embodiment of the present disclosure.

FIG. 7 provides a perspective view of a manifold 200 of an electric machine according to another example embodiment of the present disclosure. The manifold 200 of FIG. 7 is configured in the same manner as the manifold 200 of FIGS. 3 through 6 except as noted below.

For the depicted embodiment of FIG. 7, the non-electrically conductive manifold 200 defines an electrical terminal port 270 and a fluid terminal port 280. For this embodiment, the electrical terminal port 270 and the fluid terminal port 280 are both defined by the first wall 210 of the manifold 200. The electrical terminal port 270 is defined by the first wall 210 opposite the prime winding port 232A defined by the second wall 212. Stated another way, the electrical terminal port 270 is defined by the first wall 210 such that it is aligned with the prime winding port 232A defined by the second wall 212. The fluid terminal port 280 is defined by the first wall 210 between the electrical terminal port 270 and the first end 202 of the manifold 200. However, in other embodiments, the fluid terminal port 280 can be defined by the first wall 210 in other suitable locations, such as between the electrical terminal port 270 and the second end 204 of the manifold 200.

The electric machine terminal 250 extends through the electrical terminal port 270, the chamber 220 defined by the manifold 200, and one of the plurality of winding ports 232, namely the prime winding port 232A. For this embodiment, the electric machine terminal 250 is a hollow tubular number and is capped at its first end 252, e.g., to prevent cooling fluid from leaking out of the electric machine terminal 250. Notably, for this embodiment, cooling fluid enters/exits the electric machine terminal 250 at its second and 254 or through openings 256 (see FIG. 4). Cooling fluid does not enter or exit the electric machine terminal 250 through its first end 252.

As described above, the electric machine terminal 250 is connected to and in electrical communication with the prime winding 240. The electric machine terminal 250 is also in electrical communication with the electrical system 260, e.g., via the connection between the electric machine terminal 250 and the system terminal 262. In this manner, when the electric machine operates as a generator, the electric machine terminal 250 can carry electric current from the electric machine to which the manifold 200 is incorporated to the electrical system 260. When the electric machine operates as a motor, the electric machine terminal 250 can carry electric current received from the electrical system 260 to the prime winding 240. In this way, the shaft of the electric machine to which the manifold 200 is incorporated can be driven or motored about its axis of rotation.

When the manifold is an inlet manifold, the fluid terminal port 280 acts as the primary inlet through which cooling fluid enters the chamber 220. Indeed, the fluid terminal port 280 can act as the sole inlet through which cooling fluid enters the chamber 220. When the manifold is an outlet manifold, the fluid terminal port 280 acts as the primary outlet through which cooling fluid exits the chamber 220. In some embodiments, the fluid terminal port 280 can act as the sole outlet through which cooling fluid exits the chamber 220. A delivery conduit 282 can connect to the fluid terminal port 280 as shown in FIG. 7. The delivery conduit 282 can be in fluid communication with the cooling loop 132. In other embodiments, the delivery conduit 282 can be a part of form part of the cooling loop 132. Cooling fluid can be delivered to or collected from the manifold 200 via the delivery conduit 282.

Accordingly, for the depicted embodiment of FIG. 7, the cooling fluid enters/exits the manifold 200 via the universal or fluid terminal port 280 and electrical current is supplied to or collected from the prime winding 240 via the electric machine terminal 250, which is received by the electrical terminal port 270. An electric machine incorporating the manifold 200 and its features described and illustrated with respect to FIG. 7 may have the same or similar advantages and benefits provided herein with respect to the manifold described and illustrated with respect to FIGS. 3 through 6.

Figure 8:
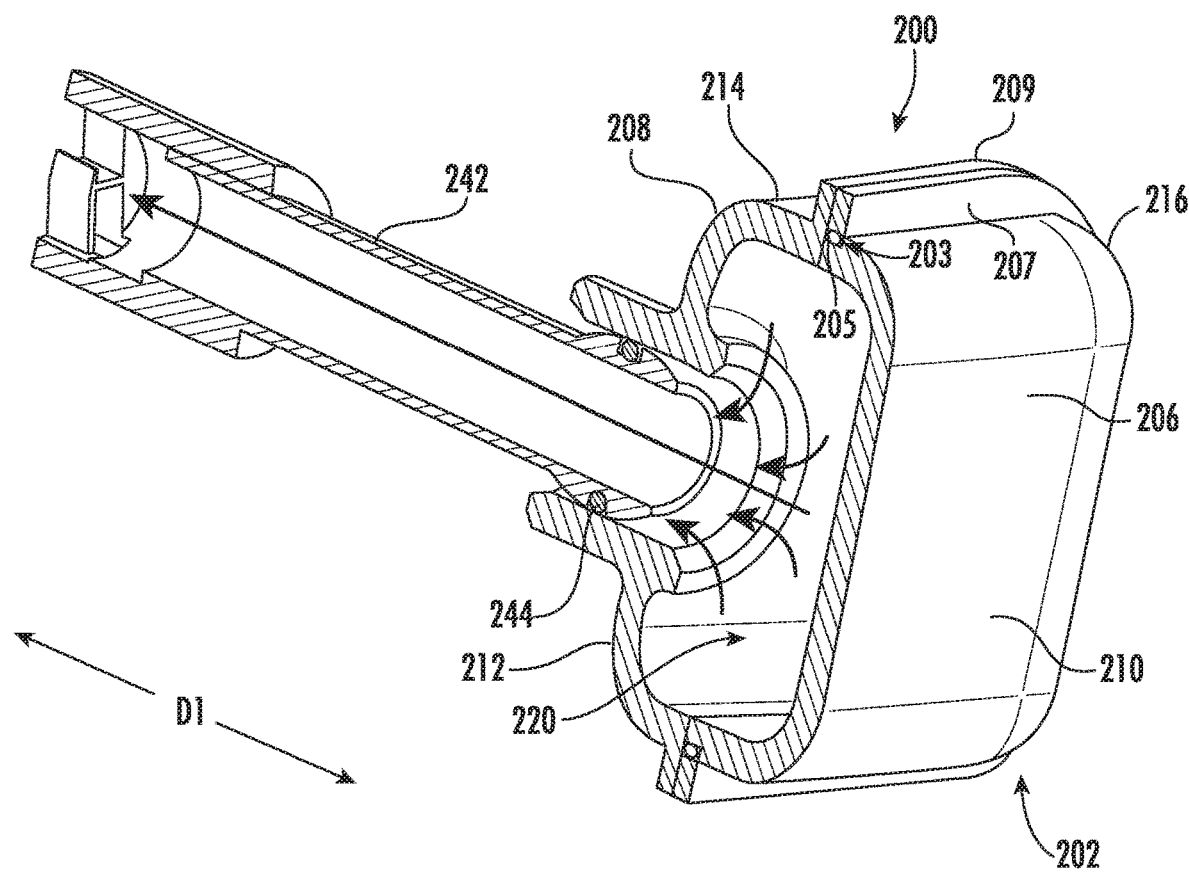
FIG. 8 provides a close-up, perspective cross-sectional view of another example manifold according to an example embodiment of the present disclosure.

FIG. 8 provides a close-up, perspective cross-sectional view of another example manifold 200 of an electric machine according to an example embodiment of the present disclosure. The manifold 200 of FIG. 8 is configured in the same manner as the manifold 200 of FIGS. 3 through 6 except as noted below.

For the depicted embodiment of FIG. 8, the manifold 200 is split into shells. Particularly, for this embodiment, the manifold 200 is split into a first shell 206 and a second shell 208. The first shell 206 generally includes the first wall 210, a portion of the sidewall 214, as well as a portion of the first endwall 216 and the second endwall 218 (not shown in FIG. 8). The second shell 208 generally includes the second wall 212, a portion of the sidewall 214, as well as a portion of the first endwall 216 and the second endwall 218 (not shown in FIG. 8). The first shell 206 has a first flange 207 that extends around the perimeter of the first shell 206. Similarly, the second shell 208 has a second flange 209 that extends around the perimeter of the second shell 208. The first and second flanges 207, 209 are aligned in communication with one another and can be fastened together in a suitable manner, e.g., by one or more fasteners. Splitting the manifold into shells may advantageously improve the manufacturability of the manifold 200.

One or both of the shells 206, 208 can define a perimeter groove in which a sealing element can be positioned. For instance, for this embodiment, the first shell 206 defines a perimeter groove 203 extending along a perimeter of the first shell 206. A sealing element 205 is positioned within the perimeter groove 203 and is operable to seal the cooling fluid within the chamber 220 of the manifold 200.

Figure 9:
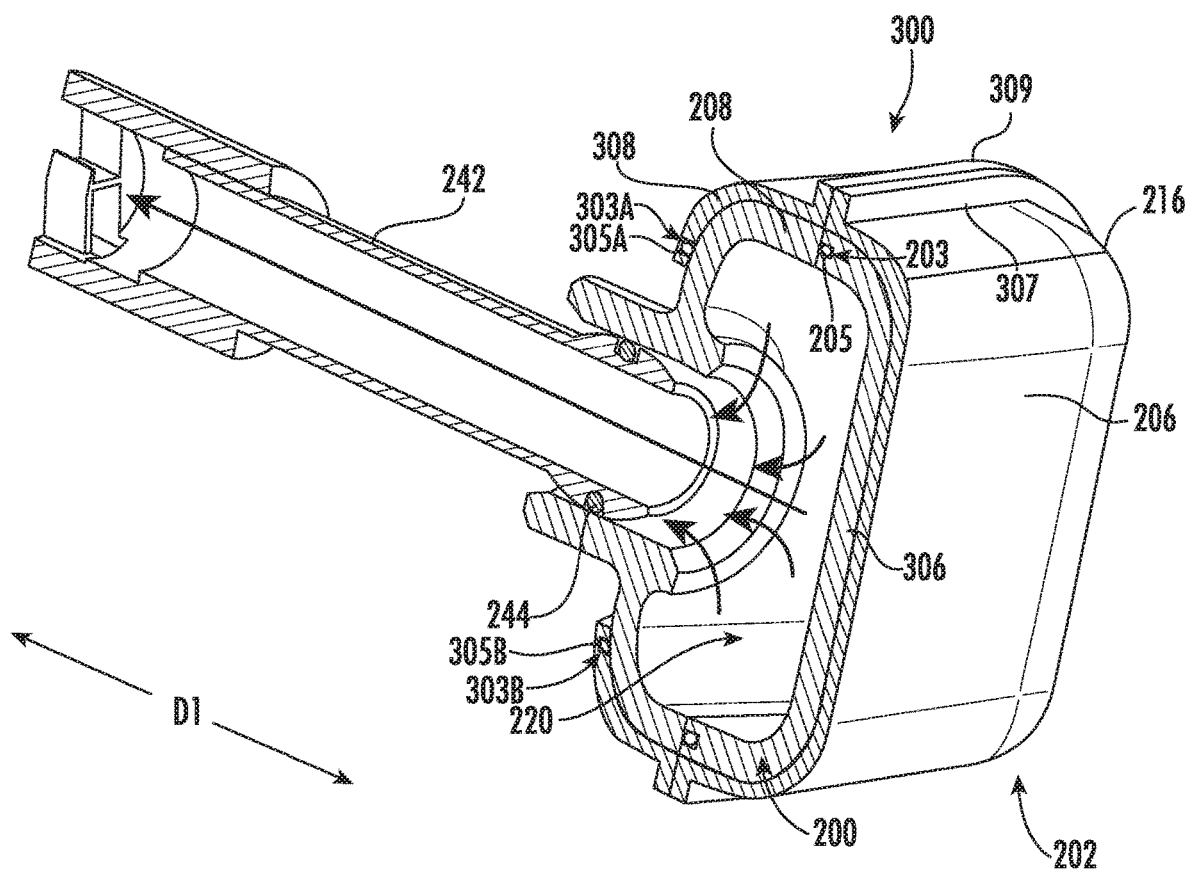
FIG. 9 provides a close-up, perspective cross-sectional view of yet another example manifold according to an example embodiment of the present disclosure.

FIG. 9 provides a close-up, perspective cross-sectional view of yet another example manifold 200 of an electric machine according to an example embodiment of the present disclosure. The manifold 200 of FIG. 9 is configured in the same manner as the manifold 200 of FIGS. 3 through 6 except as noted below.

For the depicted embodiment of FIG. 9, the manifold 200 is split into first and second shells 206, 208 as described above with reference to FIG. 8 except that the shells 206, 208 do not include flanges 207, 209 in this example embodiment. For this embodiment, a casing 300 is fit over the manifold 200 to clamp the first and second shells 206, 208 together. As shown, the casing 300 is split into a first casing shell 306 and a second casing shell 308. The first casing shell 306 has a first flange 307 that extends around the perimeter of the first casing shell 306. In other embodiments, the first flange 307 need not extend around the perimeter of the first casing shell 306. Similarly, the second casing shell 308 has a second flange 309 that extends around the perimeter of the second casing shell 308. In other embodiments, the second flange 309 need not extend around the perimeter of the second casing shell 308. The first and second flanges 307, 309 are aligned in communication with one another and can be fastened together in a suitable manner, e.g., by one or more fasteners. Splitting the casing 300 into shells may advantageously improve the manufacturability of the casing 300 and may ease assembly of the casing 300 onto the manifold 200.

Notably, the second casing shell 308 defines one or more perimeter grooves in which sealing elements can be positioned. For instance, for this embodiment, the second casing shell 306 defines a first perimeter groove 303A extending along a perimeter of the second casing shell 306. A first sealing element 305A is positioned within the perimeter groove 303A and is operable to seal any cooling fluid that has escaped the manifold 200 and leaked between the manifold 200 and the casing 300. The second casing shell 306 also defines a second perimeter groove 303B extending along a perimeter of the second casing shell 306. A second sealing element 305B is positioned within the perimeter groove 303B and is operable to seal any cooling fluid that has escaped the manifold 200 and leaked between the manifold 200 and the casing 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

1. An electric machine, comprising: a non-electrically conductive manifold defining a chamber; a prime winding in fluid communication with the chamber of the non-electrically conductive manifold; one or more secondary windings in electrical communication with the prime winding and in fluid communication with the chamber of the non-electrically conductive manifold; and an electric machine terminal extending through the non-electrically conductive manifold and coupled with the prime winding.

2. The electric machine of any preceding clause, wherein the non-electrically conductive manifold defines a terminal port and a plurality of winding ports, and wherein the electric machine terminal extends through the terminal port, the chamber, and one of the plurality of winding ports.

3. The electric machine of any preceding clause, wherein the one or more secondary windings are connected to the non-electrically conductive manifold at respective ones of the plurality of winding ports.

4. The electric machine of any preceding clause, wherein the electric machine terminal defines one or more openings through which cooling fluid flows between the electric machine terminal and the chamber of the non-electrically conductive manifold.

5. The electric machine of any preceding clause, wherein the electric machine terminal is fitted with the prime winding.

6. The electric machine of any preceding clause, wherein the electric machine terminal is in electrical communication with a power source, the electric machine terminal operable to carry electrical power received from the power source to the prime winding.

7. The electric machine of any preceding clause, wherein the electric machine terminal is operable to carry cooling fluid flowing along a closed loop to the prime winding and the chamber of the non-electrically conductive manifold.

8. The electric machine of any preceding clause, further comprising: a shaft rotatable about an axis of rotation; a rotor rotatable in unison with the shaft about the axis of rotation; and a stator, and wherein the prime winding and the one or more secondary windings are windings of the stator.

9. The electric machine of any preceding clause, further comprising: a shaft rotatable about an axis of rotation; a rotor rotatable in unison with the shaft about the axis of rotation; and a stator, and wherein the prime winding and the one or more secondary windings are windings of the rotor.

10. The electric machine of any preceding clause, wherein the non-electrically conductive manifold is an inlet manifold.

11. The electric machine of any preceding clause, wherein the non-electrically conductive manifold is an outlet manifold.

12. An electric machine, comprising: a non-electrically conductive manifold defining a chamber, a terminal port, and a plurality of winding ports; a prime winding; one or more secondary windings connected to respective ones of the plurality of winding ports, the one or more secondary windings being in electrical communication with the prime winding and in fluid communication with the chamber; and an electric machine terminal extending through the terminal port, the chamber, and one of the plurality of winding ports, the electric machine terminal being connected to and in electrical communication with the prime winding and being operable to receive cooling fluid.

13. The electric machine of any preceding clause, wherein the non-electrically conductive manifold has a first wall and a second wall spaced from the first wall, and wherein the terminal port is defined by the first wall and the plurality of winding ports are defined by the second wall.

14. The electric machine of any preceding clause, wherein the electric machine terminal a hollow tubular member.

15. The electric machine of any preceding clause, wherein cooling fluid flows through each of the plurality of secondary windings and the prime winding, and wherein the cooling fluid flowing through each of the plurality of secondary windings and the prime winding are electrically isolated from one another.

16. The electric machine of any preceding clause, wherein the non-electrically conductive manifold is formed of a non-electrically conductive composite material.

17. An electric machine, comprising: a non-electrically conductive manifold defining a chamber, a fluid terminal port through which cooling fluid enters the chamber, an electrical terminal port, and a plurality of winding ports; a prime winding; one or more secondary windings connected to respective ones of the plurality of winding ports, the one or more secondary windings being in electrical communication with the prime winding and in fluid communication with the chamber; and an electric machine terminal extending through the electrical terminal port, the chamber, and one of the plurality of winding ports, the electric machine terminal being connected to and in electrical communication with the prime winding.

18. The electric machine of any preceding clause, wherein the non-electrically conductive manifold has a first wall and a second wall spaced from the first wall, and wherein the fluid terminal port and the electrical terminal port are defined by the first wall and the plurality of winding ports are defined by the second wall.

19. The electric machine of any preceding clause, wherein the plurality of winding ports include a prime winding port, and wherein the prime winding port and the electrical terminal port are aligned with one another.

20. The electric machine of any preceding clause, wherein the electric machine terminal defines one or more openings through which cooling fluid flows between the electric machine terminal and the chamber of the manifold.

What is claimed is:

1. An electric machine, comprising:
a non-electrically conductive manifold defining a chamber;
a prime winding in fluid communication with the chamber of the non-electrically conductive manifold;
one or more secondary windings in electrical communication with the prime winding and in fluid communication with the chamber of the non-electrically conductive manifold; and
an electric machine terminal extending through the non-electrically conductive manifold and coupled with the prime winding, wherein the prime winding and at least one of the one or more secondary windings are electrically decoupled through the non-electrically conductive manifold.

2. The electric machine of claim 1, wherein the non-electrically conductive manifold defines a terminal port and a plurality of winding ports, and wherein the electric machine terminal extends through the terminal port, the chamber, and one of the plurality of winding ports.

3. The electric machine of claim 2, wherein the one or more secondary windings are connected to the non-electrically conductive manifold at respective ones of the plurality of winding ports.

4. The electric machine of claim 1, wherein the electric machine terminal defines one or more openings through which cooling fluid flows between the electric machine terminal and the chamber of the non-electrically conductive manifold.

5. The electric machine of claim 1, wherein the electric machine terminal is fitted with the prime winding.

6. The electric machine of claim 1, wherein the electric machine terminal is in electrical communication with a power source, the electric machine terminal operable to carry electrical power received from the power source to the prime winding.

7. The electric machine of claim 6, wherein the electric machine terminal is operable to carry cooling fluid flowing along a closed loop to the prime winding and the chamber of the non-electrically conductive manifold.

8. The electric machine of claim 1, further comprising:
a shaft rotatable about an axis of rotation;
a rotor rotatable in unison with the shaft about the axis of rotation; and
a stator, and
wherein the prime winding and the one or more secondary windings are windings of the stator.

9. The electric machine of claim 1, further comprising:
a shaft rotatable about an axis of rotation;
a rotor rotatable in unison with the shaft about the axis of rotation; and
a stator, and
wherein the prime winding and the one or more secondary windings are windings of the rotor.

10. The electric machine of claim 1, wherein the non-electrically conductive manifold is an inlet manifold.

11. The electric machine of claim 1, wherein the non-electrically conductive manifold is an outlet manifold.

12. An electric machine, comprising:
a non-electrically conductive manifold defining a chamber, a terminal port, and a plurality of winding ports;
a prime winding;
one or more secondary windings connected to respective ones of the plurality of winding ports, the one or more secondary windings being in electrical communication with the prime winding and in fluid communication with the chamber; and
an electric machine terminal extending through the terminal port, the chamber, and one of the plurality of winding ports, the electric machine terminal being connected to and in electrical communication with the prime winding and being operable to receive cooling fluid, wherein the prime winding and at least one of the one or more secondary windings are electrically decoupled through the non-electrically conductive manifold.

13. The electric machine of claim 12, wherein the non-electrically conductive manifold has a first wall and a second wall spaced from the first wall, and wherein the terminal port is defined by the first wall and the plurality of winding ports are defined by the second wall.

14. The electric machine of claim 12, wherein the electric machine terminal a hollow tubular member.

15. The electric machine of claim 12, wherein cooling fluid flows through each of the one or more secondary windings and the prime winding, and wherein the cooling fluid flowing through each of the one or more secondary windings and the prime winding are electrically isolated from one another.

16. The electric machine of claim 12, wherein the non-electrically conductive manifold is formed of a non-electrically conductive composite material.

17. An electric machine, comprising:
a non-electrically conductive manifold defining a chamber, a fluid terminal port through which cooling fluid enters the chamber, an electrical terminal port, and a plurality of winding ports;
a prime winding;
one or more secondary windings connected to respective ones of the plurality of winding ports, the one or more secondary windings being in electrical communication with the prime winding and in fluid communication with the chamber; and
an electric machine terminal extending through the electrical terminal port, the chamber, and one of the plurality of winding ports, the electric machine terminal being connected to and in electrical communication with the prime winding, wherein the prime winding and at least one of the one or more secondary windings are electrically decoupled through the non-electrically conductive manifold.

18. The electric machine of claim 17, wherein the non-electrically conductive manifold has a first wall and a second wall spaced from the first wall, and wherein the fluid terminal port and the electrical terminal port are defined by the first wall and the plurality of winding ports are defined by the second wall.

19. The electric machine of claim 18, wherein the plurality of winding ports include a prime winding port, and wherein the prime winding port and the electrical terminal port are aligned with one another.

20. The electric machine of claim 17, wherein the electric machine terminal defines one or more openings through which cooling fluid flows between the electric machine terminal and the chamber of the non-electrically conductive manifold.

* * * * *